(12) United States Patent
Matsubara

(10) Patent No.: US 9,489,156 B1
(45) Date of Patent: Nov. 8, 2016

(54) STREAM PRINTING METHOD FOR HANDLING LARGE PRINT JOBS TO ACHIEVE REDUCED FIRST-PAGE-OUT TIME

(71) Applicant: KONICA MINOLTA LABORATORY U.S.A., INC., San Mateo, CA (US)

(72) Inventor: Shigenori Matsubara, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/697,892

(22) Filed: Apr. 28, 2015

(51) Int. Cl.
*G06F 15/00* (2006.01)
*G06F 3/12* (2006.01)
*G06K 1/00* (2006.01)
*G06K 15/02* (2006.01)
*H04N 1/60* (2006.01)

(52) U.S. Cl.
CPC ........... *G06F 3/1212* (2013.01); *G06F 3/1243* (2013.01); *G06F 3/1259* (2013.01); *G06F 3/1295* (2013.01); *G06K 15/02* (2013.01)

(58) Field of Classification Search
CPC .. G06F 3/1212; G06F 3/1243; G06F 3/1259; G06F 3/1295; G06K 15/02
USPC ........................ 358/1.1, 1.15, 1.9, 1.13, 1.14
See application file for complete search history.

(56) References Cited

U.S. PATENT DOCUMENTS 8,259,321 B2 * 9/2012 Zhang ................... G06F 3/1208
358/1.12
2012/0050796 A1  3/2012 Yokokura

* cited by examiner

*Primary Examiner* — Douglas Tran
(74) *Attorney, Agent, or Firm* — Chen Yoshimura LLP

(57) ABSTRACT

A stream printing method implemented in a print server and a printer for handling printing of large files. The print server divides the input data file into a plurality of data chunks, and transfers them sequentially to the printer. The printer sequentially rips the data chunks and prints them. The print server dynamically monitors the system performance factors to measure, for each data chunk, the time required to extract the data chunk from the data file, the time required to transfer the data chunk to the printer, the time required to rip the data chunk, and the time required to print the data chunk. The sizes of the data chunks are calculated using these performance factors and the chunk size of a previous data chunk.

19 Claims, 3 Drawing Sheets

STREAM PRINTING METHOD FOR HANDLING LARGE PRINT JOBS TO ACHIEVE REDUCED FIRST-PAGE-OUT TIME

BACKGROUND OF THE INVENTION

1. Field of the Invention

This invention relates to a printing method, and in particular, it relates to a stream printing method for handling large print jobs to achieve reduced first-page-out time.

2. Description of Related Art

In conventional printing methods, a printer can start printing only after it receives the entire print data, resulting in long first-page-out time (FPOT). When the file is very large, for example for a VDP (variable data printing) job where the print file can be on the order of 10 GB, the user may have to wait a long time (like 20 minutes) before the printer starts printing.

SUMMARY

The present invention is directed to a printing method and related apparatus for handling large print jobs to reduce the FPOT. To improve printing efficiency, it is important to reduce FPOT as much as possible, and also to keep printing without stopping to finish printing the entire file quickly.

An object of the present invention is to provide a printing method for handling large files to achieve reduced FPOT and maintain overall efficiency.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for printing a large data file, implemented in a print server and a printer connected with each other, the method including: the print server sequentially extracting multiple consecutive data chunks from the data file; the print server sequentially transferring the multiple consecutive data chunks to the printer; the printer sequentially performing raster image processing (RIP) for the multiple consecutive data chunks to generate raster image data for each data chunk; and the printer sequentially printing the raster image data of the multiple consecutive data chunks; wherein prior to extracting a current data chunk, the print server calculates a first coefficient $\alpha_d$ as a ratio of a time required to extract a first previous data chunk and a size of the first previous data chunk, calculates a second coefficient $\alpha_x$ as a ratio of a time required to transfer a second previous data chunk and the size of the second previous data chunk, calculates a third coefficient $\alpha_r$ as a ratio of a time required to perform RIP for a third previous data chunk and the size of the third previous data chunk, and calculates a fourth coefficient $\alpha_p$ as a ratio of a time required to print a fourth previous data chunk and the size of the fourth previous data chunk, and wherein prior to extracting the current data chunk, the print server calculates a size of the current data chunk based on a size of a fifth previous data chunk and the first to fourth coefficients $\alpha_d$, $\alpha_x$, $\alpha_r$, and $\alpha_p$, wherein the first to fifth previous data chunks are the same or different data chunks which have been processed prior to extracting the current data chunk.

In another aspect, the present invention provides a method for printing a large data file, implemented in a print server connected to a printer, the method including: sequentially extracting multiple consecutive data chunks from the data file; sequentially transferring the multiple consecutive data chunks to the printer; receiving, from the printer, first timestamps indicating a start time for a raster image processing (RIP) process for each data chunk, second timestamps indicating an end time for the RIP process for each data chunk, third timestamps indicating a start time for a printing process for each data chunk, and fourth timestamps indicating an end time for the printing process for each data chunk; prior to extracting a current data chunk, calculating a first coefficient $\alpha_d$ as a ratio of a time required to extract a first previous data chunk and a size of the first previous data chunk, calculating a second coefficient $\alpha_x$ as a ratio of a time required to transfer a second previous data chunk and the size of the second previous data chunk, calculating a third coefficient $\alpha_d$ as a ratio of a time required to perform RIP for a third previous data chunk and the size of the third previous data chunk, and calculating a fourth coefficient $\alpha_p$ as a ratio of a time required to print a fourth previous data chunk and the size of the fourth previous data chunk, wherein the time required to perform RIP is calculated using the first and second timestamps received from the printer and the time required to print is calculated using the third and fourth timestamps received from the printer; and prior to extracting the current data chunk, calculating a size of the current data chunk based on a size of a fifth previous data chunk and the first to fourth coefficients $\alpha_d$, $\alpha_x$, $\alpha_r$, and $\alpha_p$, wherein the first to fifth previous data chunks are the same or different data chunks which have been processed prior to extracting the current data chunk.

In one embodiment, the print server calculates the size of the current data chunk by multiplying the size of the fifth previous data chunk by a parameter $$\frac{(\alpha x + \alpha r + \alpha p)}{(\alpha d + \alpha x + \alpha r)}$$

and by a predetermined percentage.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a printing method which divides a large print file into multiple consecutive data chunks and sends the chunks sequentially to the printer, so that the printer can start printing the first data chunk quickly, while minimizing any stop time between printing of the data chunks. The printing methods can shorten the first-page-out time, and improve throughput of the entire file, by dynamically selecting optimum sized data chunks depending on the conditions such as the print file (PDF) type, CPU load, RAM usage, network speed, print speed, etc. The processing is done in the background automatically and is transparent to the user; in other words, to the user, it works as if a single large file is being printed.

Figure 3:
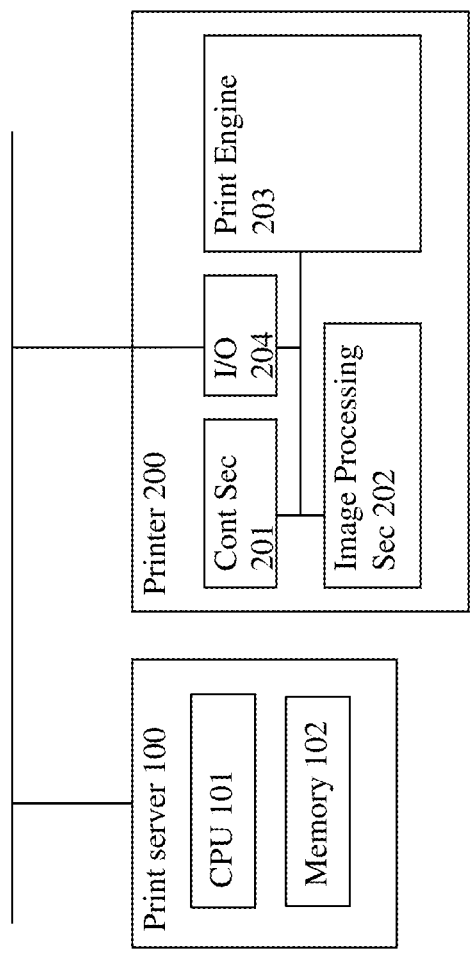
FIG. 3 schematically illustrates a system including a printer and a print server in which embodiments of the present invention may be implemented.

FIG. 3 schematically illustrates a system in which embodiments of the present invention may be implemented. It includes a print server 100 and a printer 200 connected to each other by a network. The print server 100 includes a CPU 101 which executes programs stored in a memory 102. The printer 200 includes a control section 201 which controls other parts of the printer, an image processing section 202 which performs raster image processing (RIP), a print engine 203, and an I/O interface 204.

Figure 1:
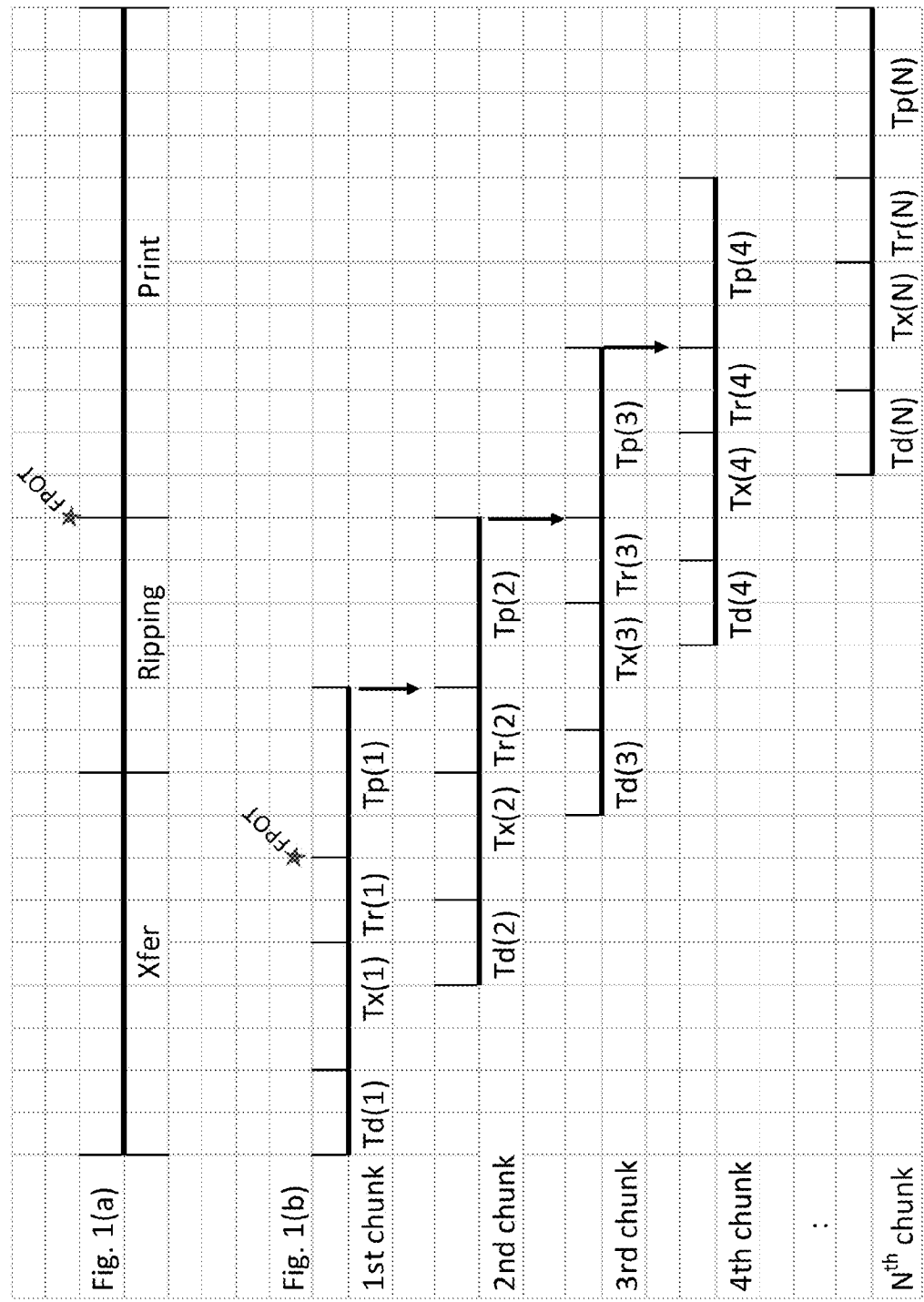
FIGS. 1(a) and 1(b) are timing diagrams that illustrate the principle of a printing method according to an embodiment of the present invention.

FIGS. 1(a) and 1(b) are timing charts which schematically illustrate the principle of the printing method according to embodiments of the present invention. FIG. 1(a) illustrates the timing of a conventional printing method, where the entire file is transferred from the print server to the printer in a first time period (labeled "Xfer" in FIG. 1(a)). After the first time period, i.e., after the printer receives the entire file, the printer executes raster image processing (RIP) for the entire file in a second time period (labeled "Ripping" in FIG. 1(a)), and then the pages of the file are sequentially printed in the third time period (labeled "Print" in FIG. 1(a)). Thus, the first-page-out time (FPOT) is at the end the second time period.

FIG. 1(b) illustrates the timing of the various steps in a printing method according to an embodiment of the present invention. The data file to be printed is divided into multiple (N) chunks. For each chunk, four processing steps are performed: (1) "Divide," i.e., extracting the data chunk from the input data file; (2) "Transfer," i.e., transferring the data chunk from the server to the printer; (3) "Rip," i.e., performing raster image processing of the data chunk to generate raster image data; and (4) "Print," i.e. printing the raster image data of the data chunk. The time periods Td(n), Tx(n), Tr(n), and Tp(n), where n=1, 2, 3, ... N, denote the amount of time required to perform these four steps, respectively, for the nth chunk:

Td(n)=Time required to extract the nth chunk (to divide the file)
Tx(n)=Time required to transfer the nth chunk
Tr(n)=Time required to Rip the nth chunk
Tp(n)=Time required to print the nth chunk The above four steps involve different hardware resources: Divide is performed by the CPU of the server; transfer is performed by the network and the I/O interface of the server and the printer, and possibly also involve the CPU of the server; RIP is performed by the image processing section of the printer; and print is performed by the print engine of the printer. Because different hardware resources are primarily involved in the different steps, the various hardware resources can concurrently process different chunks of the data file. In the example shown in FIG. 1(b), the divide process of the second chunk starts while the first chunk is being transferred and finishes while the first chunk is being Ripped by the printer; the transfer of the second chunk starts while the first chunk is being Ripped by the printer and finishes while the first chunk is being printed by the print engine; the second chunk is Ripped by the printer processor while the first chunk is being printed by the print engine; etc.

The length of each time period Td(n), Tx(n), Tr(n), and Tp(n) depend on, besides the chunk size Cs(n), various external factors including CPU speed, network speed, File characteristics, printing speed, etc. While the overall CPU speed of a server is known, how much CPU power is available to this printing process depends on the other processes and applications concurrently running on the server, which varies dynamically and cannot be known beforehand. The same is true for network speed: while the overall speed of the network is known, the actual transfer speed for particular data depends on other traffic on the network or other processes that share the network I/O hardware.

File characteristics, in particular, the average amount of data per printed page, is dependent on the file being printed. For large files in VDP applications, because they typically contain repeating pages, if the chunk sizes are sufficiently large, it can typically be assumed that the average amount of data per page does not vary significantly from chunk to chunk within a file. For example, if a VDP file contains 1000 3-page letters, the first 100 pages and the next 100 pages will have similar average data per page. File characteristics can, however, vary among different files.

Printing speed, in terms of the number of pages printed per minute, is a generally a known factor; but since the data amount per page is unknown as explained above, printing speed in terms of amount of data per minute is not known beforehand.

Although all of the above-discussed factors can vary, it can be assumed that they do not change drastically within a short period of time (e.g. a few minutes). Based on this assumption, the time periods for the four steps can be expressed as follows (Equation 1):

$$Td(n)=\alpha_d \cdot Cs(n)$$

$$Tx(n)=\alpha_x \cdot Cs(n)$$

$$Tr(n)=\alpha_r \cdot Cs(n)$$

$$Tp(n)=\alpha_p \cdot Cs(n)$$

where $\alpha_d$, $\alpha_x$, $\alpha_r$, and $\alpha_p$ are coefficients, and Cs(n) is the size of the nth chunk (for example, in units of MB). The coefficients are parameters that can be measured or estimated in the following ways.

The time required to divide the file for the nth chunk, Td(n), is measureable in the print handling program itself. The time required to transfer the chunk, Tx(n), is also measureable in the program itself. The time required to Rip the chunk, Tr(n), is not directly measurable in the program, but can be obtained by getting timestamps from the printer controller. The time required to print the chunk, Tp(n), is not directly measurable in the program, but again can be obtained by getting timestamps from the printer.

Thus, these coefficients $\alpha_d$, $\alpha_x$, $\alpha_r$, and $\alpha_p$ can be measured for each data chunk that has been printed, and used to estimate the time required to process subsequent data chunks. In a preferred embodiment, the values of the coefficients $\alpha_d$, $\alpha_x$, $\alpha_r$, and $\alpha_p$ are continuously updated using the chunk that has just been processed, as indicated in the following equations (Equation 2):

$$\alpha_d = \frac{Td(1)}{Cs(1)} \to \frac{Td(2)}{Cs(2)} \to \frac{Td(3)}{Cs(3)} \to \ldots \to \frac{Td(n)}{Cs(n)}$$

$$\alpha_x = \frac{Tx(1)}{Cs(1)} \to \frac{Tx(2)}{Cs(2)} \to \frac{Tx(3)}{Cs(3)} \to \ldots \to \frac{Tx(n)}{Cs(n)}$$

$$\alpha_r = \frac{Tr(1)}{Cs(1)} \to \frac{Tr(2)}{Cs(2)} \to \frac{Tr(3)}{Cs(3)} \to \ldots \to \frac{Tr(n)}{Cs(n)}$$

$$\alpha_p = \frac{Tp(1)}{Cs(1)} \to \frac{Tp(2)}{Cs(2)} \to \frac{Tp(3)}{Cs(3)} \to \ldots \to \frac{Tp(n)}{Cs(n)}$$

Then, the coefficients can be used to determine the optimum size of the subsequent chunks to be printed using the following method.

In order to achieve maximum throughput on the printer, printing should not stop between data chunks. In other words, printing of the nth chunk should start immediately after printing of the (n−1)th chunk is completed. This condition can be expressed by the following equation (Equation 3):

$$Tx(n-1)+Tr(n-1)+Tp(n-1) > Td(n)+Tx(n)+Tr(n)$$

Referring to FIG. 1(b), the meaning of Equation 3 is that the time period Td(n) can start any time after the time period Td(n−1) finishes, and the time Tr(n) should finish before the time period Tp(n−1) finishes so that the process Tp(n) can start as soon as the time period Tp(n−1) finishes. Using Equation 1, Equation 3 can be written as (Equation 4):

$$(\alpha_x+\alpha_r+\alpha_p)\cdot Cs(n-1) > (\alpha_d+\alpha_x+\alpha_r)\cdot Cs(n)$$

Or (Equation 5):

$$Cs(n) < \frac{(\alpha x + \alpha r + \alpha p)}{(\alpha d + \alpha x + \alpha r)} \cdot Cs(n-1).$$

By using the values of the coefficients $\alpha_d$, $\alpha_x$, $\alpha_r$, and $\alpha_p$ obtained from Equation 2, the optimum data chunk size for the nth chunk, Cs(n), can be calculated from those coefficients and the data chunk size of the previous chunk, Cs(n−1), using Equation 5.

It is noted that the data chunk size for the nth chunk needs to be calculated before the "divide" step for the nth chunk starts. At this time, some of the steps for the (n−1)th chunk, or even earlier chunks, are not yet finished. This is the case in the example shown in FIG. 1(b). Thus, the most recently updated values for the coefficients $\alpha_d$, $\alpha_x$, $\alpha_r$, and $\alpha_p$ are calculated from an earlier chunk, rather than the immediately previous chunk (the (n−1)th chunk). However it is assumed that the values of these coefficients do not vary significantly from one chunk to the next chunk, the most recent updated values of the coefficients are used in Equation 5, even though they are not calculated from the immediately previous data chunk.

In the example of FIG. 1(b), for example, after time period Td(4) ends, the CPU is ready to calculate the data chunk size for the next chunk, Cs(5). At this time, Td(4) is finished, so the most recently updated $\alpha_d$ is the one calculated from Td(4) and Cs(4). Tx(4) is not yet finished but Tx(3) is finished, so the most recently updated $\alpha_x$ is the one calculated from Tx(3) and Cs(3). Tr(3) is not yet finished but Tr(2) is finished, so the most recently updated $\alpha_r$ is the one calculated from Tr(2) and Cs(2). Tp(2) is not yet finished but Tp(1) is finished, so the most recently updated $\alpha_p$ is the one calculated from Tp(1) and Cs(1).

Referring back to Equation 5, because the processing (dividing) of each data chunk requires additional overhead for the CPU, it is desirable to divide the data file into as few data chunks as possible. Thus, theoretically, the data chunk size for the nth chunk Cs(n) should be equal to the value given by the right-hand side of Equation 5 (which is the theoretical maximum value) to reduce the total number of data chunks. In practice, in order to deal with unexpected variations in the speeds of the various hardware components, the size of the nth data chunk should be slightly small then the theoretical maximum value to allow for a buffer time. For example, the chunk size for the nth data chunk may be set as a predetermined percentage R (e.g. R=90% or other suitable values) of the theoretical maximum value, i.e. (Equation 6), $$Cs(n) = R \cdot \frac{(\alpha x + \alpha r + \alpha p)}{(\alpha d + \alpha x + \alpha r)} \cdot Cs(n-1)$$

Using this equation, the print server calculates the size of the nth data chunk, and proceeds to generate the data chunk from the data file.

The chunk size of the first data chunk, Cs(1), is set to a suitable value before the divide process starts. A smaller size will reduce the FPOT, which is desirable; however, since the size of the first data chunk influences the sizes of subsequent data chunks, the first data chunk should be sufficiently large so that the data file is not divided into too many data chunks. In one example, a size of 100 MB is used for Cs(1).

The initial values of the coefficients $\alpha_d$, $\alpha_x$, $\alpha_r$, and $\alpha_p$ may be set based on average values of these coefficients from past print jobs or test print jobs.

It should be noted that the size of the nth data chunk can also be calculated from the (n−2)th data chunk or even earlier data chunks, for example:

$$Cs(n) < \left[\frac{\alpha x + \alpha r + \alpha p}{\alpha d + \alpha x + \alpha r}\right]^2 \cdot Cs(n-2)$$

or $$Cs(n) = R^2 \cdot \left[\frac{\alpha x + \alpha r + \alpha p}{\alpha d + \alpha x + \alpha r}\right]^2 \cdot Cs(n-2)$$

A stream printing method for handling large print jobs is described below with reference to FIG. 2. Steps S11-S13 are a timestamp listener process running on the server 100; steps S21-S28 are a file handling process running on the server 100. These two processes run separately and concurrently, and exchange data via a shared data structure 30 on the server 100. Also as illustrated in FIG. 2, the printer 200 transmits various timestamp signals to the server 100.

Figure 2:
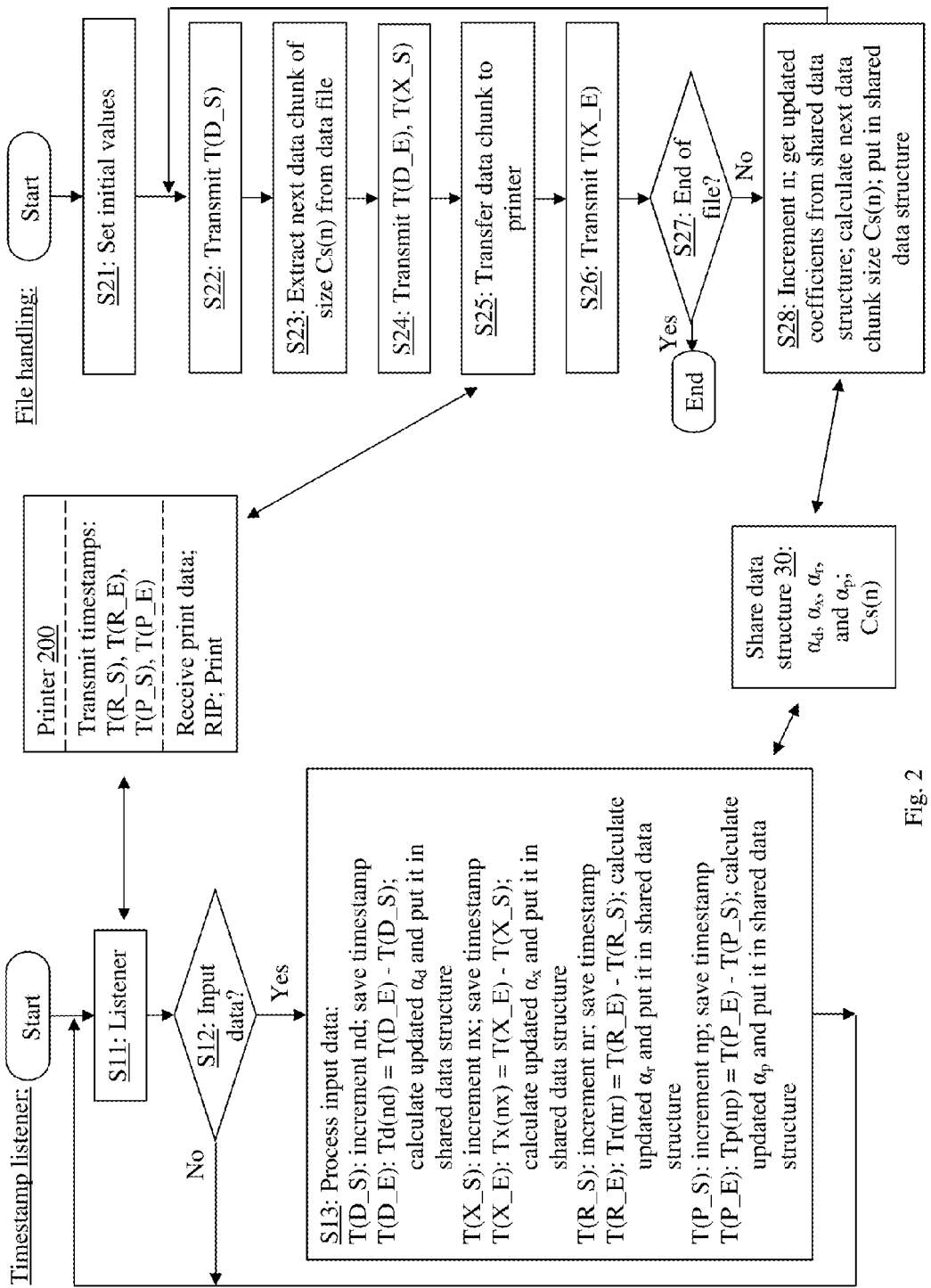
FIG. 2 is a flow chart that illustrates a printing method according to an embodiment of the present invention.

As shown in FIG. 2, the timestamp listener process continues to listen to timestamp signals from file handing process and from the printer 200 (step S11). The following timestamp signals are received from the file handling process:

Timestamp(DIVIDE_START): for the start of the Divide step;

Timestamp(DIVIDE_END): for the Divide finished event;

Timestamp(XFER_START): for the Transfer start event.
Timestamp(XFER_END): for the Transfer finished event.
The following timestamp signals are received from the printer 200:
Timestamp(RIP_START): for the RIP start event;
Timestamp(RIP_END): for the RIP finished event;
Timestamp(PRINT_START): for the print start event;
Timestamp(PRINT_END): for the print finished event.

The timestamp listener process keeps four individual counters nd, nx, nr and np for the four processing steps Divide, Transfer, Rip and Print, respectively. The counters are initialized to zero.

When an input timestamp data is received (step S12), it is processed in step S13 as follows. Note that in box S13 in FIG. 2, the various timestamps are abbreviated for convenience, e.g., Timestamp(DIVIDE_START) is abbreviated as T(D_S), etc.

If the input timestamp data is T(D_S) (start of the Divide step), the counter nd for the Divide step is incremented by 1 and the received timestamp is saved in association with the counter value nd. If the input data is T(D_E) (end of the Divide step), the time period Td(nd) is set to the difference between T(D_E) and T(D_S); the updated parameter $\alpha_d$ is calculated from Equation 2 (using the data chunk size for the data chunk corresponding to the counter value nd), and is put in the shared data structure.

Similarly, if the input data is T(X_S), T(R_S) or T(P_S), the corresponding individual counter is incremented and the timestamp is stored in association with the counter. If the input data is T(X_E), T(R_E) or T(P_E), the time period Tx(nx), Tr(nr) or Tp(np) are set as the difference between the respective start an end timestamps; the updated parameter $\alpha_x$, $\alpha_r$, or $\alpha_p$ is calculated from Equation 2 (using the data chunk size for the data chunk corresponding to the counter value nx, nr or np), and is put in the shared data structure.

For this calculation, the timestamp listener process obtains the data chunk size data from the shared data structure, which has been supplied by the file handling process. In an alternative embodiment, instead of calculating the coefficients $\alpha_d$, $\alpha_x$, $\alpha_r$, and $\alpha_p$, the timestamp listener process may simply put the time period data Td, Tx, Tr and Tp into the shared data structure, and the step of calculating the coefficients $\alpha_d$, $\alpha_x$, $\alpha_r$, and $\alpha_p$ can be performed by the file handling process.

The timestamp listener process then returns to step S11 to continue to listen for the next timestamp signal.

The file handling process is described next.

After the file handling process starts for a data file, it first sets the initial values for the data chunk size Cs(1) and the coefficients $\alpha_d$, $\alpha_x$, $\alpha_r$, and $\alpha_p$ (step S21). The data chunk index (counter) n is set to 1 in this step. Then, the file handling process obtains the timestamp for the start of the Divide step (T(D_S)) and sends the timestamp signal to the timestamp listener process (step S22), and proceeds to extract the next data chunk of size Cs(n) from the input data file for the print job (n=1 for the first data chunk) (step S23). When the Divide step is finished, the file handling process obtains the timestamp for the Divide finished event (T(D_E)) and sends the timestamp signal to the timestamp listener process (step S24).

The file handling process then obtains the timestamp for the Transfer start event (T(X_S)) and sends the timestamp signal to the timestamp listener process (step S24), and proceeds to transfers the data chunk to the printer (step S25). When the Transfer step is finished, the file handling process obtains the timestamp for the Transfer finished event (T(X_E)) and sends the timestamp signal to the timestamp listener process (step S26).

Then, if the input data file is not yes all processed ("No" in step S27), the file handling process increments the chunk index n, gets the updated coefficients $\alpha_d$, $\alpha_x$, $\alpha_r$, and $\alpha_p$ from the shared data, calculates the chunk size Cs(n) of the next data chunk (step S28), and returns to step S22 to start processing the next data chunk.

In step S28, the file handling process also puts the chunk size Cs(n) in the shared data so that the timestamp listener process can use it to calculate the updated coefficients $\alpha_d$, $\alpha_x$, $\alpha_r$, and $\alpha_p$. As mentioned earlier, in an alternative embodiment, the calculation of Equation 2 can be performed by the file handling process rather than the timestamp listener process, in which case step S28 of the file handling process will not include putting the chunk size Cs(n) in the shared data, but will include getting the parameters Td, Tx, Tr and Tp from the shared data and calculating the coefficients $\alpha_d$, $\alpha_x$, $\alpha_r$, and $\alpha_p$ using Equation 2.

By this process, the data file is divided into multiple data chunks and sequentially processed and printed. It reduced the FPOT an also maintains overall processing efficiency. It will be apparent to those skilled in the art that various modification and variations can be made in the stream printing method and related apparatus of the present invention without departing from the spirit or scope of the invention. Thus, it is intended that the present invention cover modifications and variations that come within the scope of the appended claims and their equivalents.

What is claimed is:

1. A method for printing a large data file, implemented in a print server and a printer connected with each other, the method comprising:
   the print server sequentially extracting multiple consecutive data chunks from the data file;
   the print server sequentially transferring the multiple consecutive data chunks to the printer;
   the printer sequentially performing raster image processing (RIP) for the multiple consecutive data chunks to generate raster image data for each data chunk; and
   the printer sequentially printing the raster image data of the multiple consecutive data chunks;
   wherein prior to extracting a current data chunk, the print server calculates a first coefficient $\alpha_d$ as a ratio of a time required to extract a first previous data chunk and a size of the first previous data chunk, calculates a second coefficient $\alpha_x$ as a ratio of a time required to transfer a second previous data chunk and the size of the second previous data chunk, calculates a third coefficient $\alpha_r$ as a ratio of a time required to perform RIP for a third previous data chunk and the size of the third previous data chunk, and calculates a fourth coefficient $\alpha_p$ as a ratio of a time required to print a fourth previous data chunk and the size of the fourth previous data chunk, and
   wherein prior to extracting the current data chunk, the print server calculates a size of the current data chunk based on a size of a fifth previous data chunk and the first to fourth coefficients $\alpha_d$, $\alpha_x$, $\alpha_r$, and $\alpha_p$, wherein the first to fifth previous data chunks are the same or different data chunks which have been processed prior to extracting the current data chunk.

2. The method of claim 1, wherein the fifth previous data chunk is an immediately previous data chunk of the current data chunk, and wherein the print server calculates the size of the current data chunk by multiplying the size of the fifth previous data chunk by a parameter $$\frac{(\alpha x + \alpha r + \alpha p)}{(\alpha d + \alpha x + \alpha r)}$$

and by a predetermined percentage.

3. The method of claim 1, wherein prior to extracting a first data chunk of the file, the print server sets a size of the first data chunk to a predetermined size.

4. The method of claim 3, wherein the predetermined size is determined based on information from previous print jobs.

5. The method of claim 1, wherein prior to extracting a second data chunk of the file, the print server sets values of the first to fourth coefficients $\alpha_d$, $\alpha_x$, $\alpha_r$, and $\alpha_p$ to predetermined initial values.

6. The method of claim 5, wherein the predetermined initial values are determined based on information from previous print jobs.

7. The method of claim 1, further comprising:
the printer transmitting to the print server first timestamps indicating a start time for the RIP for each data chunk, second timestamps indicating an end time for the RIP for each data chunk, third timestamps indicating a start time for the printing for each data chunk, and fourth timestamps indicating an end time for the printing for each data chunk,
wherein the time required to perform RIP for the third previous data chunk is calculated using the first and second timestamps for the third previous data chunk received from the printer and the time required to print the fourth previous data chunk is calculated using the third and fourth timestamps for the fourth previous data chunk received from the printer.

8. A method for printing a large data file, implemented in a print server connected to a printer, the method comprising:
sequentially extracting multiple consecutive data chunks from the data file;
sequentially transferring the multiple consecutive data chunks to the printer;
receiving, from the printer, first timestamps indicating a start time for a raster image processing (RIP) process for each data chunk, second timestamps indicating an end time for the RIP process for each data chunk, third timestamps indicating a start time for a printing process for each data chunk, and fourth timestamps indicating an end time for the printing process for each data chunk;
prior to extracting a current data chunk, calculating a first coefficient $\alpha_d$ as a ratio of a time required to extract a first previous data chunk and a size of the first previous data chunk, calculating a second coefficient $\alpha_x$ as a ratio of a time required to transfer a second previous data chunk and the size of the second previous data chunk, calculating a third coefficient $\alpha_r$ as a ratio of a time required to perform RIP for a third previous data chunk and the size of the third previous data chunk, and calculating a fourth coefficient $\alpha_p$ as a ratio of a time required to print a fourth previous data chunk and the size of the fourth previous data chunk,
wherein the time required to perform RIP is calculated using the first and second timestamps received from the printer and the time required to print is calculated using the third and fourth timestamps received from the printer; and prior to extracting the current data chunk, calculating a size of the current data chunk based on a size of a fifth previous data chunk and the first to fourth coefficients $\alpha_d$, $\alpha_x$, $\alpha_r$, and $\alpha_p$, wherein the first to fifth previous data chunks are the same or different data chunks which have been processed prior to extracting the current data chunk.

9. The method of claim 8, wherein the fifth previous data chunk is an immediately previous data chunk of the current data chunk, and wherein the print server calculates the size of the current data chunk by multiplying the size of the fifth previous data chunk by a parameter $$\frac{(\alpha x + \alpha r + \alpha p)}{(\alpha d + \alpha x + \alpha r)}$$

and by a predetermined percentage.

10. The method of claim 8, further comprising:
prior to extracting a first data chunk of the file, setting a size of the first data chunk to a predetermined size.

11. The method of claim 10, wherein the predetermined size is determined based on information from previous print jobs.

12. The method of claim 8, further comprising:
prior to extracting a second data chunk of the file, setting values of the first to fourth coefficients $\alpha_d$, $\alpha_x$, $\alpha_r$, and $\alpha_p$ to predetermined initial values.

13. The method of claim 12, wherein the predetermined initial values are determined based on information from previous print jobs.

14. A computer program product comprising a computer readable non-transitory medium having a computer readable program code embedded therein for controlling a print server, the computer readable program code configured to cause the print server to execute a process for printing a large data file, the process comprising:
sequentially extracting multiple consecutive data chunks from the data file;
sequentially transferring the multiple consecutive data chunks to the printer;
receiving, from the printer, first timestamps indicating a start time for a raster image processing (RIP) process for each data chunk, second timestamps indicating an end time for the RIP process for each data chunk, third timestamps indicating a start time for a printing process for each data chunk, and fourth timestamps indicating an end time for the printing process for each data chunk;
prior to extracting a current data chunk, calculating a first coefficient $\alpha_d$ as a ratio of a time required to extract a first previous data chunk and a size of the first previous data chunk, calculating a second coefficient $\alpha_x$ as a ratio of a time required to transfer a second previous data chunk and the size of the second previous data chunk, calculating a third coefficient $\alpha_r$ as a ratio of a time required to perform RIP for a third previous data chunk and the size of the third previous data chunk, and calculating a fourth coefficient $\alpha_p$ as a ratio of a time required to print a fourth previous data chunk and the size of the fourth previous data chunk, wherein the time required to perform RIP is calculated using the first and second timestamps received from the printer and the time required to print is calculated using the third and fourth timestamps received from the printer; and prior to extracting the current data chunk, calculating a size of the current data chunk based on a size of a fifth previous data chunk and the first to fourth coefficients $\alpha_d$, $\alpha_x$, $\alpha_r$, and $\alpha_p$, wherein the first to fifth previous data chunks are the same or different data chunks which have been processed prior to extracting the current data chunk.

15. The computer program product of claim 14, wherein the fifth previous data chunk is an immediately previous data chunk of the current data chunk, and wherein the print server calculates the size of the current data chunk by multiplying the size of the fifth previous data $$\frac{(\alpha x + \alpha r + \alpha p)}{(\alpha d + \alpha x + \alpha r)}$$

chunk by a parameter and by a predetermined percentage.

16. The computer program product of claim 14, wherein the process further comprises:

prior to extracting a first data chunk of the file, setting a size of the first data chunk to a predetermined size.

17. The computer program product of claim 16, wherein the predetermined size is determined based on information from previous print jobs.

18. The computer program product of claim 14, wherein the process further comprises:

prior to extracting a second data chunk of the file, setting values of the first to fourth coefficients $\alpha_d$, $\alpha_x$, $\alpha_r$, and $\alpha_p$ to predetermined initial values.

19. The computer program product of claim 18, wherein the predetermined initial values are determined based on information from previous print jobs.

* * * * *